P. J. L'EVESQUE.
PORTABLE ELECTRIC LAMP.
APPLICATION FILED MAR. 17, 1920.
1,432,876.
Patented Oct. 24, 1922.
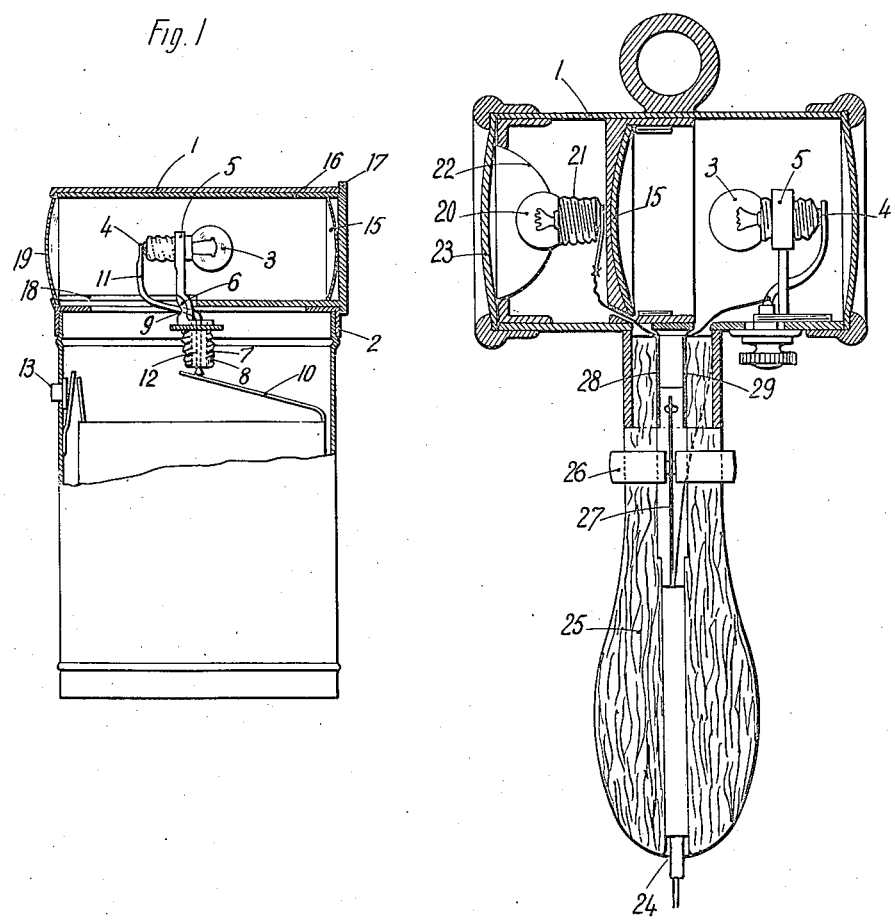
Inventor.
Paul J. L'Evesque
by Chas. J. O'Neill
Atty Patented Oct. 24, 1922.

1,432,876

UNITED STATES PATENT OFFICE.

PAUL J. L'EVESQUE, OF PARIS, FRANCE, ASSIGNOR TO COMPAGNIE GENERALE D'ELECTRICITE, OF PARIS, FRANCE.

PORTABLE ELECTRIC LAMP.

Application filed March 17, 1920. Serial No. 366,722.

(GRANTED UNDER THE PROVISIONS OF THE ACT OF MARCH 3, 1921, 41 STAT. L., 1313.)

*To all whom it may concern:*

Be it known that I, PAUL J. L'EVESQUE, citizen of the French Republic, residing at Paris, Department of the Seine, in France, and having P. O. address 54 Rue la Boetie, in the said city, have invented certain new and useful Improvements in Portable Electric Lamps (for which applicant has obtained patents in France, No. 477,157, September 29, 1915 and Addition 20,283 of June 1st, 1917).; and I do hereby declare the following to be a full, clear, and exact description of the invention, such as will enable others skilled in the art to which it appertains to make and use the same.

This invention relates to portable electric lamps and one of its objects is to provide a reflector which can be easily mounted on said lamps; the beam of light in these lamps is generally badly concentrated and the efficiency is, on this account, greatly impaired. The focus of the projector is adjustable and can be erected in some few minutes on the casing of the battery or accumulator, the beam of light being parallel and much more effective than the usual diverging mirror.

Another object is to provide a portable electric lamp with two lamps and two projectors of different types. The first group comprising a small incandescent lamp and a projector, the beam of light of which is parallel; and the second group comprising a projector by means of which a small object, at a great distance, can be lit by an incandescent lamp with an ordinary reflector giving a diffused light for lighting an object situated very near.

The accompanying drawings illustrate the two modes of carrying the invention.

Fig. 1 illustrates one form of the invention using a single lamp.

Fig. 2 illustrates a modified form of the invention using two lamps.

In the type illustrated Fig. 1, the projector comprises a cylindrical tube 1 provided with a rectangular seating 2 which can, in this case, take the place of the cover of an ordinary electric pocket lamp. The lamp bulb is screwed into a support 5 mounted on the foot 6; the lower part of which 8 is threaded in order to be screwed in the sleeve 7 which is ordinarily used for the lamp socket. A small metallic arm 11 passing through a hole 9 pierced in the foot 6 connects one of the contacts 4 of the lamp with one of the poles of the battery.

The small arm 11 is insulated from the casing and foot 6 by a small insulating sleeve 12.

In order to erect the foot 6 on socket 7 it is only necessary to screw said foot into the socket 7; the lower part of arm 11 comes into contact with the supply of electricity. When, one, pushes the button 13 a flat spring connects the metallic casing with the other pole of the battery, the circuit being closed the lamp gives light. In order to get a beam of light concentrated, a projector 15 is mounted in a sleeve 16 which can slide in the tube 1; said sleeve 16 having a bottom 17, the diameter of which is larger than tube 1, and a longitudinal groove 18 to clear mounting of lamp. The face of said projector is such that the rays of light of the lamp are projected in the shape of a parallel beam. The sleeve 16 can be displaced inside tube 1 in order to focus the projector relatively to the lamp filament. A glass protector 19 may close other end of tube 1 in order to protect the device against dust.

The beam of light so obtained is considerably more powerful than the one of usual portable lamp; for instance, the conductor of an automobile, or any other person, can read road indications at a great distance on account of the strong beam concentrated on a small space.

The Fig. 2 illustrates the mounting of the device with two lamps. A cylindrical tube 1 encloses a lamp 3 and a projector 15 which reflects parallel rays. 4 and 5 is a lamp support which is adjustable by an ordinary thumbscrew or the like. The group producing diffused light comprises a lamp 20 secured to a screw socket 21 of a reflector 22 which in its turn is held by tightening a projecting glass 23. A two-wire conductor cable 24 passes through a wooden handle 25, and electric current can be supplied either to one or to the other lamp by pushing a cross-bar 26 in one or in the other direction. This movement brings a metal rod 27 which is connected to one of the wires of the source of current, into contact with a connection 28 for the diffused light lamp, or 29 for the projector lamp. The plates 28 and 29 are each connected to an insulated wire running to the respective lamps. The other terminal of each lamp is of course also connected to the source of current by being grounded through the lamp casing which is in turn connected to the other wire of the conductor cable 24. The source of current can be either an ordinary dry battery or a group of accumulators which is generally available in a motor car.

Claims:

1. A portable electric lamp construction adapted to be associated with the necessary current supply, comprising a tubular casing, means for mounting therein a source of light and a movable reflector therefor, whereby a more or less concentrated light ray can be produced according to the position to which the reflector is moved relative to the source of light.

2. A portable electric lamp construction adapted to be associated with the necessary current supply, comprising a tubular casing, means for mounting therein a source of light, an annular member slidably positioned within said casing, and a reflector carried by said member, whereby the distance between the light and the reflector may be regulated for producing a more or less concentrated light ray.

3. A portable electric lamp construction adapted to be associated with the necessary current supply, comprising a tubular casing, means for mounting therein two lamps and reflectors therefor, furnishing a source of light, and means for regulating the distance between one of said lights and its reflector for producing a more or less concentrated light ray.

4. A portable electric lamp construction adapted to be associated with the necessary current supply, comprising a tubular casing, means for mounting a lamp at each end thereof, furnishing a source of light, reflectors associated with said lamps, one of said lamps being permanently arranged with respect to its reflector for producing a diffused light, and means for regulating the distance between the other light and its reflector for producing a more or less concentrated light ray.

5. A portable electric lamp construction adapted to be associated with the necessary current supply, comprising a tubular casing, means for mounting a lamp at each end thereof, furnishing a source of light, reflectors associated with said lamps, one of said lamps being permanently arranged with respect to its reflector for producing a diffused light, means for regulating the distance between the other light and its reflector for producing a more or less concentrated light ray, and means for selectively closing the circuit to either lamp as desired.

In testimony whereof I affix my signature.

PAUL J. L'EVESQUE.